Patented Sept. 28, 1937

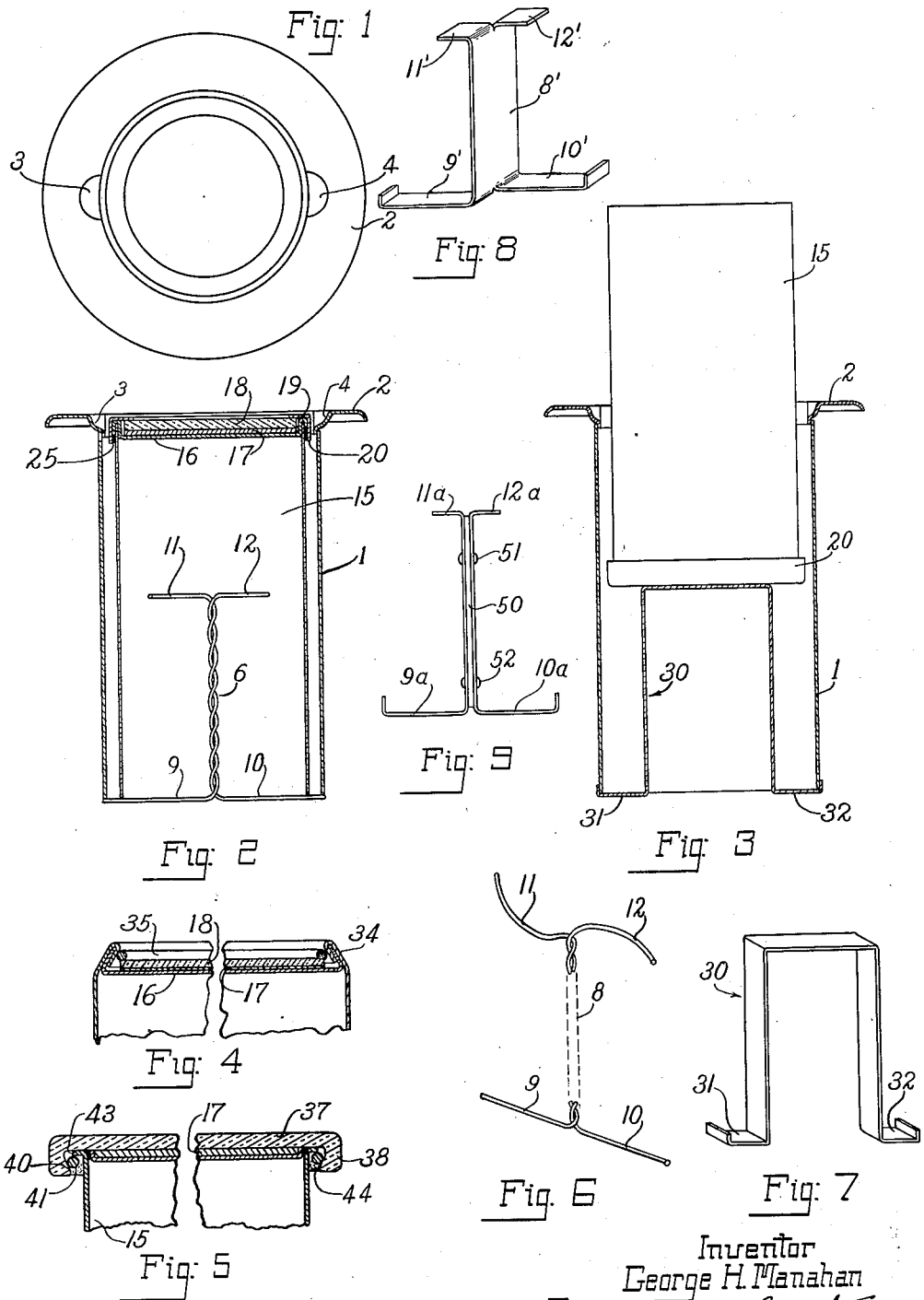

2,094,129

UNITED STATES PATENT OFFICE 2,094,129

GROUND VASE AND GRAVE MARKER

George H. Manahan, Goshen, Ind.

Application March 10, 1937, Serial No. 130,142

11 Claims. (Cl. 47—41)

This invention relates to cemetery vases and to grave markers.

The need for vases for holding cut flowers at cemeteries has long been recognized, and various structures have heretofore been provided for that purpose. Such structures have heretofore been open to the very serious objection that they interfered with the ready cutting of the grass. Where glass vases were used there was the additional objection that the glass was likely to become broken and would interfere with and possibly injure the lawn mower. Furthermore, flower vases, whether of glass or metal, are likely to be stolen by petty thieves. I have found, however, that if the vase itself is constructed and arranged to constitute also a grave marker theft of the same is not as likely to occur. It is therefore one of the objects of the present invention to provide a simple and economical vase which may be used also as a grave marker and which, when in its grave marking position, does not in any way interfere with the operation of a lawn mower moving thereover. A simple combination ground vase and grave marker consists of a cylindrical or other holder which is embedded in the ground and which has a removable vase therein which can be mounted in one position to receive and hold cut flowers, and mounted in the reverse position where it displays an epitaph, when not used as a vase.

It is a further object of this invention to provide a holder for a cemetery flower vase wherein a simple and economical means is provided for holding the vase with its top surface flush with the ground and closed when the same is not holding flowers, but which may be reversed to have the open end of the vase at the top and extending appreciably above the ground when the same is in position to receive cut flowers. It is a still further object of the present invention to provide an improved and simplified form of cemetery ground vase of which one end thereof constitutes a grave marker and is provided with means for holding a printed paper or other identifying means in place and protected against the action of rain, sleet, and dirt or dust, as well as against other deteriorating causes.

The attainment of the above and further objects of the present invention will be apparent from the following specification taken in conjunction with the accompanying drawing forming a part thereof.

In the drawing:

Figure 1 is a top view of a combination grave marker and flower vase constructed in accordance with the teachings of the present invention;

Figure 2 is a longitudinal sectional view thereof with the flower vase in its inverted or grave marking position;

Figure 3 is a longitudinal sectional view through another construction of a combined grave marker and flower vase, with the vase in its flower holding position;

Figure 4 is a fragmentary sectional view through the end of a grave marker and flower vase of an alternate construction;

Figure 5 is a view similar to Figure 4 and illustrating still another construction;

Figure 6 is an isometric view of the means used in the construction of Figure 2 for holding the flower vase in its alternate positions;

Figure 7 is an isometric view of an alternate means used for holding the vase in its alternate position, as illustrated in Figure 3;

Figure 8 is an isometric view illustrating still another arrangement for holding the vase in its alternate positions; and Figure 9 is an end view illustrating still another arrangement for holding the vase in its alternate positions.

Reference may now be had more particularly to the embodiment of my invention illustrated in Figures 1 and 2. The combined vase and grave marker comprises a cylindrical ground vase holder 1 open at the top and bottom, which may be made of sheet metal, earthenware, vitreous material, or any other material which can be placed in the ground and which will not deteriorate. The holder is provided with a circular flange 2 at the top, preferably of sheet metal, suitably secured to the holder 1. The holder is placed in the ground with the top of the flange 2 flush with the surface of the ground so that a lawn mower, or the like, may readily pass over the same. The top flange 2 may contain suitable printed matter thereon, either indicating the name of the manufacturer, or the name of the cemetery or cemetery association having charge of the plot of ground where it is located. The flange 2 is provided with finger depressions 3—4, for which purpose the top of the ground vase holder 1 is provided with mating semi-circular openings. A vase support 6 is secured to the bottom of the vase holder 1, which support is of a construction such as is shown more particularly in Figure 6, and comprises two wires twisted together to form a vertical shank 8 with the lower ends of the two wires bent horizontally, as indicated at 9 and 10, and welded or otherwise suitably secured to the bottom of the ground vase holder 1 so that the shank portion 8 extends vertically within the ground vase holder 1 for approximately half of the height thereof. The upper ends of the two twisted wires are bent to lie in a horizontal plane and are slightly curved, as indicated at 11 and 12 in Figures 2 and 6. The portions 9 and 10 constitute a support for the vase and grave marker when the same is in inverted or grave marking position, whereas the horizontal arms 11 and 12 constitute a support for the vase and grave marker when the same is in its flower holding position.

The vase and grave marker is indicated by the reference numeral 15 and comprises a can open at one end and closed at its other end by a closure 16, the connection between the closure 16 and the cylindrical portion of the receptacle 15 being of the same construction as in an ordinary tin can such as is used for food canning purposes. In Figure 2 I have shown the vase and grave marker in inverted position, to-wit: in its grave marking position, that is, with its open end downwardly and its closed end at the top. The top surface 16 is depressed slightly below the top edge of the cylindrical wall of the grave marker and vase 15. Within this depression is located a suitable marker 17 overlaid by a transparent glass cover 18. The marker 17 may comprise a piece of paper, parchment, a metal disc, or the like, on which the usual epitaph is marked. The glass 18 is a protecting covering for the marker 17. A metal ring 19 having a vertical flange 20 around its periphery is pressed over the end of the vase and grave marker and serves as a retaining ring for holding the glass 18 and the marker 17 in place. Suitable sealing material may be located around the inner periphery of the ring 19 to seal against the entrance of moisture between the ring and the glass 18 and thus prevent the deteriorating action of weather upon the marker 17. If desired a further filling of gummy material may be provided at 25 between the flange 20 and the cylindrical surface 15 to prevent any possible entrance of moisture into the place occupied by the marker 17 when the vase is inverted from the position illustrated in Figure 2 to its flower holding position. The outer surface of the vase may be chromium plated or otherwise treated to enhance its appearance and inhibit deteriorating action of the weather. The top of the ring 19 is substantially flush with the top flange 2 and with the plane of the ground surface so that there is no interference with the usual operation of a lawn mower.

When it is desired to use the structure of Figures 1 and 2 for holding fresh cut flowers it is merely necessary to grip the ring 19 at the finger depressions 3 and 4, and thus withdraw the vase. The vase is then inverted with respect to the position shown in Figure 2 and is lowered into the ground vase holder 1 until the glass 18 rests upon the arms 11 and 12, the open end of the vase being then at the top and appreciably above the ground surface so that the vase will hold flowers in a presentable and pleasing manner. This is illustrated in Figure 3.

The structure of Figure 3 differs from that of Figure 2 only in that here the vase support, indicated by the reference numeral 30, which is illustrated more particularly in Figure 7, is provided in lieu of the vase support 6 of Figure 2. The support 30 comprises a narrow strip of material, preferably of sheet metal, bent into inverted U-shape with the outer ends of the U bent horizontally to provide short arms 31—32 that correspond to the arms 9—10 of Figure 2, and constitute a support for the vase when the vase is in a position inverted with respect to the position illustrated in Figure 3, to-wit: in its grave marking position. The arms 31—32 are welded or otherwise suitably secured to the ground vase holder 1.

In Figures 4 and 5 I have illustrated alternate methods of securing the marker 17 and the glass 18 in place. In the construction shown in Figure 4 the bottom 16 of the vase is mounted at a slightly greater distance vertically inward with respect to the end of the cylindrical wall of the vase, and the end of the cylindrical wall is forced radially inwardly slightly, as indicated at 34. The marker 17 and the glass 18 are inserted in place and then held in place by a split spring wire or ring 35. The ring 35 comprises a usual split ring of springy material with the ends thereof spaced apart slightly to permit forcing of the ends thereof together to reduce the diameter, whereupon the ring is inserted in place and the ends then released so that the natural resiliency of the ring causes the same to expand and thus hold the glass 18 against retraction. A suitable coating of shellac, or other water-proofing material, may be provided for preventing the entrance of dirt or moisture past the glass 18, to the injury of the marker 17.

In the construction illustrated in Figure 5 the marker is indicated at 17 and the glass cover at 37. The cover is provided with a peripheral flange 38 having a tapered wall 40. The cover 37 is placed over the can, at which time the radially innermost edge of the wall 40 is spaced from the periphery of the can 15 an amount sufficient to permit insertion of a spring metal split ring 41 between the wall 40 and the can 15 when the ring has been compressed by drawing the two separated ends thereof towards one another. When the ring has been inserted in place between the inner edge of the wall 40 and the periphery of the can 15 the ring expands to its natural shape and by engagement with an outer flange 43 around the periphery of the can it prevents withdrawal of the glass cover 37. This positively seals against the entrance of dirt or moisture into contact with the marker 17 when the vase is in inverted or grave marking position. If desired, a filling of plastic self setting material 44 may be provided to prevent the entrance of moisture between the glass cover 37 and the marker 17 when the vase is in its upright or flower holding position.

In the construction illustrated in Figure 5 it is apparent that a peripheral rim 38 around the glass cover 37 will prevent the entrance of any moisture into the place occupied by the marker 17 when the vase is used for grave marking purposes. The filling 44 will prevent any possible entrance of moisture when the vase is positioned upright for holding cut flowers.

In Figure 8 I illustrate another arrangement for holding the vase in either of its two alternate positions. This vase support comprises a piece of sheet metal approximately an inch or so in width, which piece is slit lengthwise for a short distance at the top and for a somewhat greater distance at the bottom, the metal being then bent to provide opposite projections 11' and 12' at the top thereof for holding the vase in elevated position and for providing portions 9' and 10' similar to the portions 9 and 10, for holding the vase in its inverted positions. The portions 9' and 10' have short upturned flanges at their outer ends which flanges are welded or otherwise secured to the holder 1 in the same manner as are the supports of Figures 6 and 7.

In the construction illustrated in Figure 9 the support comprises two similar pieces of sheet metal each approximately one-half inch wide, which are bent to provide upper horizontal portions 11a and 12a and lower horizontal portions 9a and 10a for the purposes previously described. The two pieces of sheet metal are secured together by rivets 51 and 52. If desired a spacer 50 may be interposed between the two pieces of sheet metal to impart rigidity to the support. The support of Figure 9 is arranged in position in the same manner as is the support of Figure 7.

From my above description it is apparent that I have provided a combined grave marker and flower holder which is simple and economical of construction, which will not interfere with the ordinary mowing of the lawn when the structure is in grave marking position, and which may readily be inverted for holding cut flowers. In view of the fact that the vase 15 also constitutes the grave marker, it is not as likely to be deliberately broken, or stolen, by small boys, since the presence of the epitaph is a deterrent to such action.

In compliance with the requirements of the patent statutes I have here shown and described a few preferred embodiments of my invention. It is, however, to be understood that the invention is not limited to the precise constructions here shown and described, the same being merely illustrative of the principles of the invention. What I consider new and desire to secure by Letters Patent is:

1. A combined grave marker and flower vase comprising a casing open at one end and closed at the other end, an epitaph marker mounted on the outer side of the closed end of the casing and rigid with respect to the casing, and means for supporting the casing with either end uppermost whereby the casing acts as a flower vase when mounted with its open end uppermost, and as an epitaph marker when reversed.

2. A combined grave marker and flower vase comprising a casing open at one end and closed at the other end, an epitaph marker mounted on the outer side of the closed end of the casing, a transparent cover for the epitaph marker and rigid with respect to the casing, and means for supporting the casing with either end uppermost whereby the casing acts as a flower vase when mounted with its open end uppermost, and as an epitaph marker when reversed.

3. A combined grave marker and flower vase comprising a casing open at one end and closed at the other end, an epitaph marker mounted on the outer side of the closed end of the casing, a glass cover for the epitaph marker, means for securing the marker and cover in place and for sealing against the entry of moisture into contact with the marker and rigid with respect to the casing, and means for supporting the casing with either end uppermost whereby the casing acts as a flower vase when mounted with its open end uppermost, and as an epitaph marker when reversed.

4. A combined grave marker and flower vase comprising a casing open at one end and closed at the other end, an epitaph marker mounted on the outer side of the closed end of the casing, a glass cover for the epitaph marker, and means for securing the marker and cover in place and for sealing against the entry of moisture into contact with the marker, said means including a ring around the edge of the cover and tightly gripping the periphery of the casing.

5. A combined grave marker and flower vase comprising a casing open at one end and closed at the other end, an epitaph marker mounted on the outer side of the closed end of the casing, a glass cover for the epitaph marker, and means for securing the marker and cover in place and for sealing against the entry of moisture into contact with the marker, said means including a rim around the cover and integral therewith, which rim extends around the outside of the casing.

6. A combined grave marker and flower holder comprising a receptacle open at one end for receiving flowers and closed at its opposite end, means for holding the receptacle in an upright position and at different elevations with either end uppermost, and an epitaph marker on the receptacle and rigid with respect thereto and so located as to be exposed to view when the receptacle is held with its closed end uppermost.

7. A combined grave marker and flower holder comprising an outer casing adapted to be set in the ground, an inner casing within the outer casing, said inner casing being open at one end and closed at the other end, means for supporting the inner casing within the outer casing with either end of the inner casing uppermost and at different elevations depending upon which end is uppermost, and an epitaph marker rigidly secured on the inner casing and exposed to view when the inner casing is mounted with its closed end uppermost in the outer casing.

8. A combined grave marker and flower holder comprising an outer casing open at both ends adapted to be set in the ground with the top thereof substantially flush with the surface of the ground, an inner casing within the outer casing, said inner casing being open at one end and closed at the other end, means for supporting the inner casing within the outer casing with either end of the inner casing uppermost, said supporting means comprising a transverse bar extending across the open end of the outer casing adjacent the bottom thereof upon which the peripheral edge of the inner casing rests when inserted into the outer casing with its closed end uppermost, said transverse bar having an upwardly extending projection upon which the closed end of the inner casing rests in elevated position when the inner casing is inserted into the outer casing with its closed end lowermost, the part of the transverse bar that supports the peripheral edge of the inner casing being spaced from the top of the outer casing an amount substantially equal to the height of the inner casing whereby the closed end of the inner casing is substantially flush with the surface of the ground when the inner casing is positioned with its closed end uppermost.

9. A combined grave marker and flower holder comprising an outer casing adapted to be set in the ground with the top thereof substantially flush with the surface of the ground, an inner casing within the outer casing said inner casing being open at one end and closed at the other end, means for supporting the inner casing within the outer casing with either end of the inner casing uppermost, said supporting means comprising a transverse member extending across the outer casing adjacent the bottom thereof upon which the peripheral edge of the inner casing rests when inserted into the outer casing with its closed end uppermost, said transverse member having an upwardly extending projection upon which the closed end of the inner casing rests in elevated position when the inner casing is inserted into the outer casing with its closed end lowermost, the part of the transverse member that supports the peripheral edge of the inner casing being spaced from the top of the outer casing an amount substantially equal to the height of the inner casing whereby the closed end of the inner casing is substantially flush with the surface of the ground when the inner casing is positioned with its closed end uppermost, and an epitaph marker secured on the outer side of the closed end of the inner casing.

10. A combined grave marker and flower holder comprising an outer casing adapted to be set in the ground with the top thereof substantially flush with the surface of the ground, an inner casing within the outer casing said inner casing being open at one end and closed at the other end, means for supporting the inner casing within the outer casing with either end of the inner casing uppermost, said supporting means comprising a transverse member extending across the outer casing adjacent the bottom thereof upon which the peripheral edge of the inner casing rests when inserted into the outer casing with its closed end uppermost, said transverse member having an upwardly extending projection upon which the closed end of the inner casing rests in elevated position when the inner casing is inserted into the outer casing with its closed end lowermost, the part of the transverse member that supports the peripheral edge of the inner casing being spaced from the top of the outer casing an amount substantially equal to the height of the inner casing whereby the closed end of the inner casing is substantially flush with the surface of the ground when the inner casing is positioned with its closed end uppermost, an epitaph marker secured on the outer side of the closed end of the inner casing, a transparent protecting cover for the epitaph marker, and means for sealing against the entry of moisture past the cover to the epitaph marker.

11. A combined grave marker and flower holder comprising a tubular casing open at one end and closed at the other end, an epitaph marker overlying the outside of the closed end and substantially coextensive therewith, and means rigidly securing the marker to the casing.

GEORGE H. MANAHAN.